Feb. 11, 1964   J. J. BUNDSCHUH ET AL   3,120,791
EXPOSURE CONTROL MEANS FOR PHOTOGRAPHIC CAMERA
Filed May 7, 1962   3 Sheets-Sheet 3
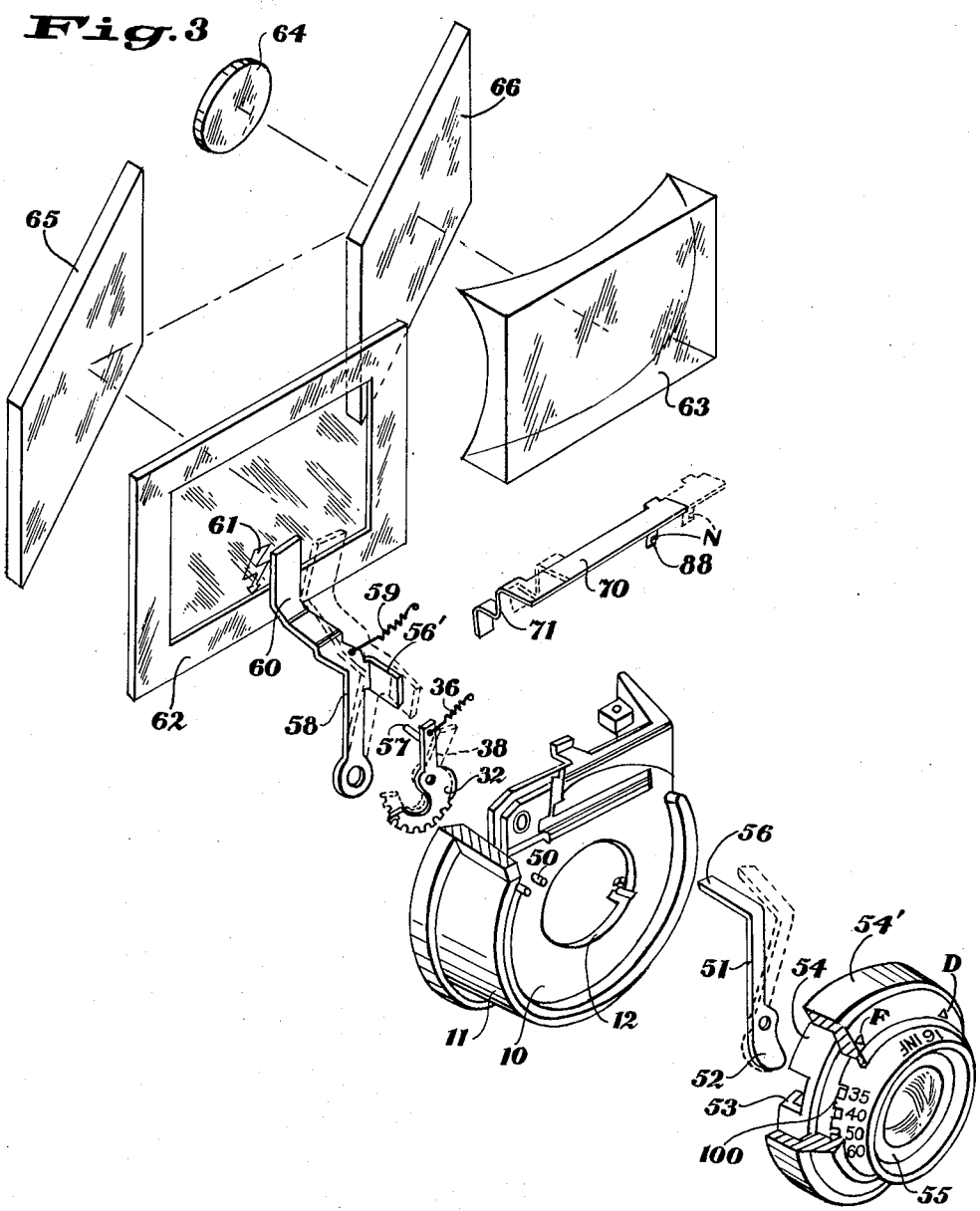
John J. Bundschuh
William T. Hochreiter
Richard J. Bresson
INVENTORS
BY R. Frank Smith
ATTORNEYS

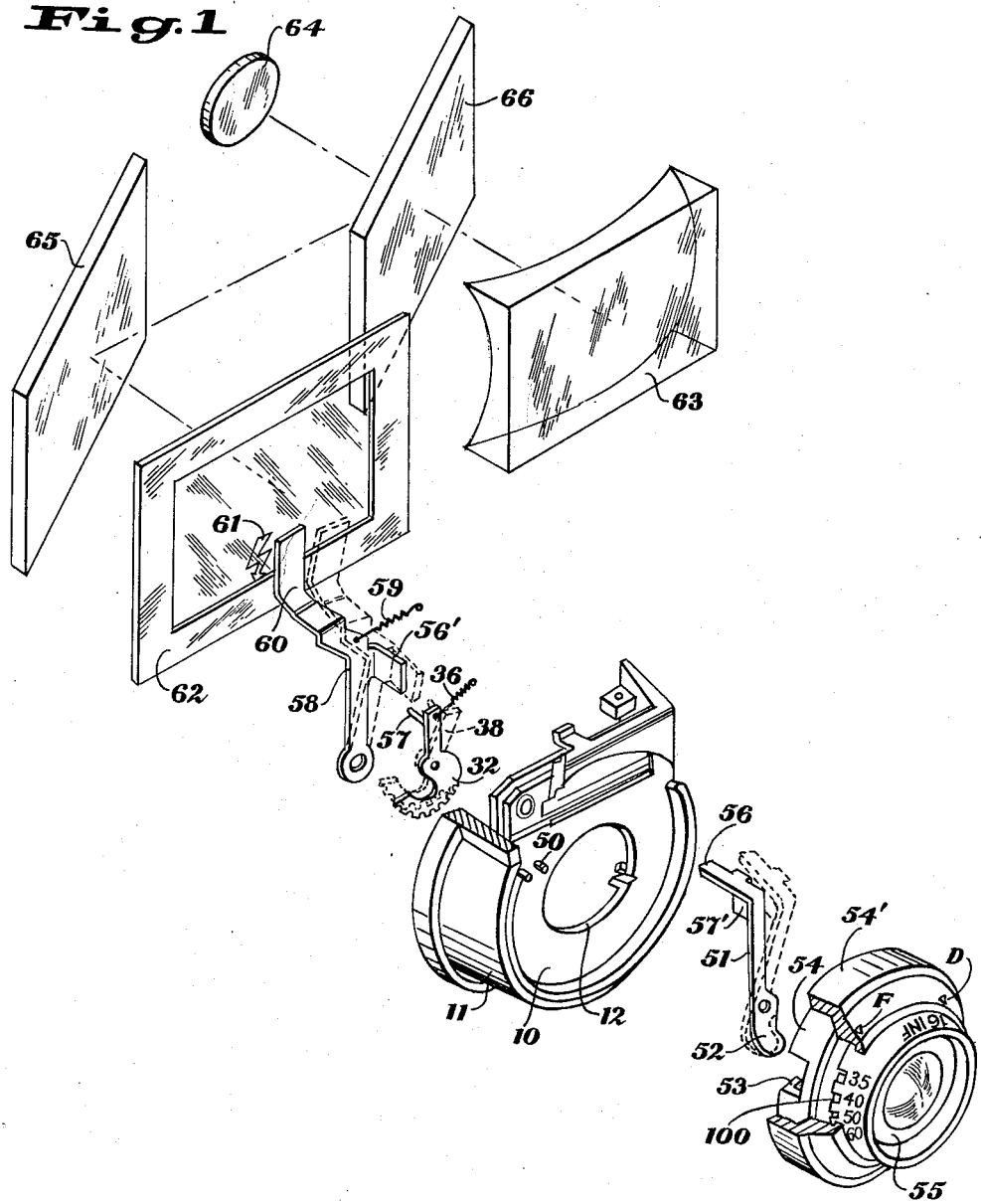

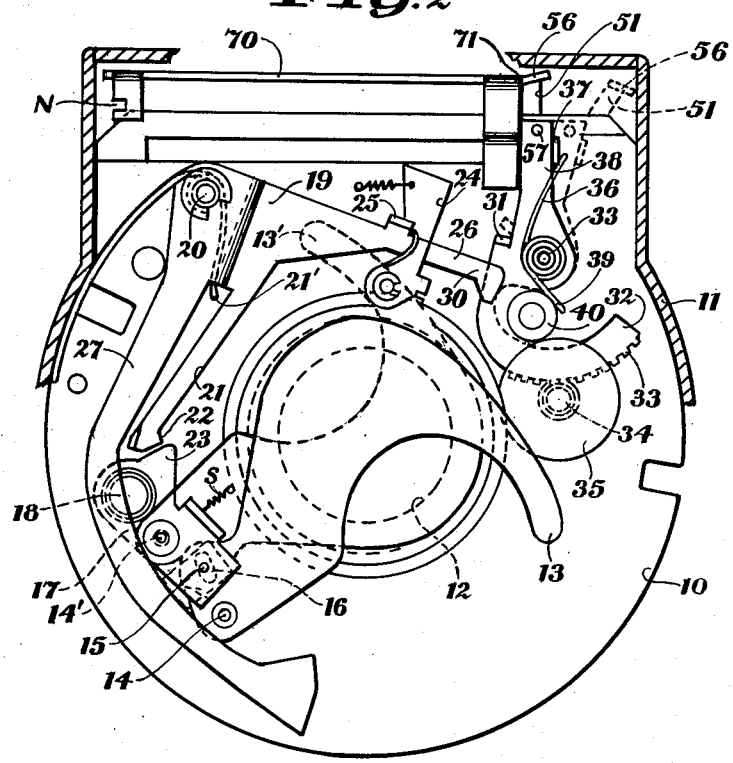
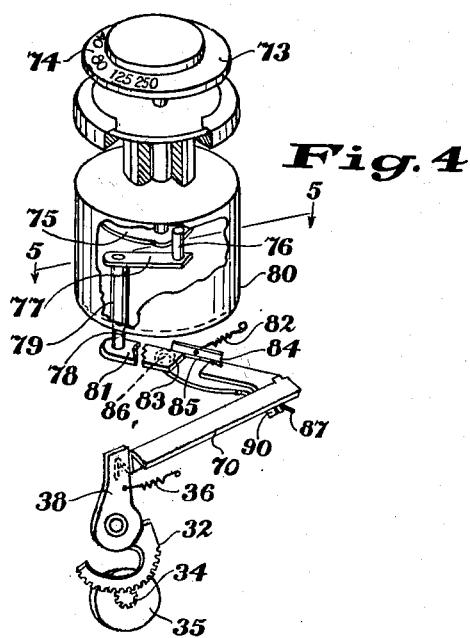
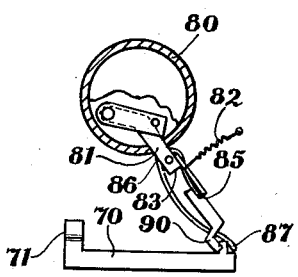

3,120,791
EXPOSURE CONTROL MEANS FOR PHOTOGRAPHIC CAMERA

John J. Bundschuh, William T. Hochreiter, and Richard J. Bresson, Rochester, N.Y., assignors to Eastman Kodak Company, Rochester, N.Y., a corporation of New Jersey
Filed May 7, 1962, Ser. No. 192,683
13 Claims. (Cl. 95—11)

The present invention relates to photographic cameras adapted for selectively making both daylight and flash exposures, and more particularly concerns means for automatically setting the exposure control means of a camera in correspondence with the type of exposure to be made (daylight or flash) and/or making an indicating means visible in the finder to show what type of exposure the camera is set for.

Most cameras today have built-in flash synchronizers and many have built-in flash holders so that they are capable of taking both daylight or flash exposures by merely placing a lamp in the built-in flash holder or attaching a flash holder to the camera body. Ordinarily, flash exposures require more light than daylight exposures which means that the exposure control means of the camera must be adjusted to give an increased exposure when flash pictures are to be made as compared to exposures used for daylight pictures. This can be accomplished by either slowing down the shutter speed or opening the diaphragm or doing a combination of both. With cameras equipped with multiple-speed shutters and/or multiple-position diaphragms which are manually adjustable or automatically adjusted by automatic exposure control means including photocells under conditions of daylight operation, this means that when making flash light exposures these manual and/or automatic exposure control systems must be overriden when the camera is set for flash work. This overriding must be done in such a way that the manual or automatic exposure control system is capable of again assuming control of the exposure system of the camera when the operator desires to switch back to making daylight exposures. Furthermore, it is desirable, if not imperative, that the operator be informed at all times whether the camera is set for daylight or flash operation so that he will not attempt to make flash pictures when the exposure control system is set for daylight exposures and vice versa.

It is a principal object of the present invention to provide in a camera having a manually adjustable exposure control means capable of a plurality of positions of adjustment, one for flash exposures and the remaining ones for daylight exposures, a connection between the exposure control means and the manual means for adjusting the same which is rupturable and/or can be overridden so that the exposure control means will be automatically adjusted to said one position corresponding to flash exposures, regardless of the setting of said manual adjusting means, when a member mounted on the camera for selective movement between a first position corresponding to flash exposures and a second position corresponding to daylight exposures is moved to said first position, and which connection will be automatically restored when said member is moved to said second position indicative of daylight exposures.

It is another object of the present invention to provide in a camera having an adjustable exposure control means capable of at least two positions of adjustment, one for flash exposures and a second for daylight exposures, and a finder provided with a flash signal which can be made to appear and disappear from the field thereof, means for causing said flash signal to appear in the field of said finder when the exposure control means is adjusted for flash exposures and for causing said flash signal to disappear from the finder field when the exposure control means is adjusted for daylight exposures.

Another object of the invention is to provide a camera of the type mentioned with a selector movable between two positions, one for flash exposures and the other for daylight exposures, said selector being coupled to the exposure control means and flash signal to move them into their corresponding positions of adjustment depending upon the adjustment of said selector between its two positions.

A further object is to provide a camera of the type mentioned in which said selector surrounds the camera lens and is oscillatable between two positions, one indicating flash exposures and the other daylight exposures.

A further object is to provide a camera of the type mentioned having a multiple-speed shutter under the control of an automatic exposure control system or a manually adjusted speed setting member for daylight exposures, the connection between the shutter and said control systems being such that it can be manually overridden by a selector being moved to set the camera for flash exposures at which time the shutter is set at its slowest speed, but which connection is automatically re-established when the selector is manually moved to set the camera for daylight exposures.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings in which:

FIG. 1 is an exploded isometric view of the essential parts of a camera constructed in accordance with one embodiment of our invention;

FIG. 2 is an enlarged rear elevational view, partly in section, of a multiple-speed shutter forming a part of our invention;

FIG. 3 is an exploded isometric view of the essential parts of a camera showing another embodiment of our invention;

FIG. 4 is a perspective view showing a mechanism for manually adjusting the speed of the shutter used in the FIG. 3 embodiment; and FIG. 5 is a sectional detail, taken substantially on line 5—5 of FIG. 4, to clearly show the spring connection between the shutter mechanism and the speed adjusting member for the shutter to permit the latter member to be manually overridden when the camera is set for flash exposures.

Briefly, the simplest form of the present invention concerns a camera having a two-speed shutter, the slower speed being used for flash exposures and the faster speed being used for daylight exposures. The camera also includes a finder into and form the field of which a signal may be moved to give a visual indication as to when the camera is set for flash exposures and when it is set for daylight exposures. A selector member is provided on the camera and is capable of movement between two positions, one indicating daylight exposures and the other flash exposures. This selector is coupled to the shutter and finder signal in such a way that when it is moved to its "flash" position, the flash signal is moved into the field of the finder and the shutter is adjusted for operation at its slow speed. When the selector is moved to its "daylight" position, the flash signal is removed from the finder field and the shutter is set to operate at its faster speed.

In a more elaborate embodiment of the invention, a multiple-speed shutter is used, the slowest of the speeds being used for flash work and the remaining speeds being for daylight work and being under the control of a manual speed setting knob or an automatic exposure control system. The connection between the selector and the shutter speed setting knob is such that when the selector is set to its "flash" position, it can override the regular shutter speed setting means and set the shutter to its slowest speed regardless of the setting of the shuter speed knob, and the instant the selector is returned to its "daylight" setting the regular shutter speed setting knob will reassume control of the shutter speed at its previously adjusted setting.

Before proceeding with a description of the overall combination, it will facilitate an understanding thereof to explain the operation of the shutter and how its speed is adjusted. Referring now particularly to FIG. 2, which shows the shutter from the rear, the shutter mechanism is mounted on a mechanism plate 10 contained within and dividing a casing 11 having an exposure aperture 12 at its center. This shutter comprises two like blade members 13 and 13' individually pivoted at points 14 and 14', respectively, to the mechanism plate and interconnected between the pivot points by a pin 15 engaging slots 16 in opposite ones of the blades so that radial movement of the pin 15 in one direction spreads the blades apart to open the shutter and closes the blades when moved in the opposite direction. Shutters having this type of blade operating means are well known and disclosed in many patents including U.S. 2,525,549. The pin 15 is carried by a blade moving lever 17 pivoted to the mechanism plate at 18 and is normally spring pressed in a counterclockwise direction by a spring S to close the blades. A three-arm master member 19, pivoted to the mechanism plate at 20 and spring loaded in a counterclockwise direction by spring 21', includes one arm 21 have a cam surface 22 which is adapted to engage a nose 23 on the blade moving lever 17 and drive it to its blade opening position when the master member is released by a spring operated trigger 24 being disengaged from a latching lug 25 on the second arm 26 of the master member. The third arm 27 of the master member is engageable by the film winding mechanism of the camera, not shown, to cock the master member and set the shutter.

Between the time the cam surface 22 on the first arm 21 of the master member has engaged the blade moving lever 17 to open the shutter and slips off this lever to allow the blades to close, the end 30 of the second arm 26 of the master lever 19 is adapted to engage a lug 31 on the sector 32 of a retard mechanism for the purpose of delaying the closing time of the blades. This sector 32 is pivoted on the mechanism plate at 33 and has rack teeth 33' engaging a pinion 34 fixed to a flywheel 35. The sector is normally rotated in a counterclockwise direction, looking at FIG. 2, by a spring 36 wrapped around its pivot and having one end pressing against a lug 37 on the upright arm 38 of the sector while the other end 39 of the spring is anchored against a stud 40 on the mechanism plate. By adjusting the position of the lug 31 on the retard sector in the path of the second arm of the master member the time of blade closing can be adjusted to thereby alter the shutter speed. For example, the closer lug 31 is set to the end 30 of arm 26 of the master member 19, the sooner the retard begins to oppose the movement of the master member after cam 22 on arm 21 has moved lever 17 to open the blades and the longer it takes for cam 22 to slip off nose 23 of the lever 17 to allow the blades to close. This is the main factor of the shutter which must be remembered in order to understand the present invention. In FIG. 2 the full-line position of the sector member 32 shows the position it assumes when the shutter is set at its slowest speed, whereas the dotted-line position shows the position it assumes when the second arm 26 of the master member 19 has moved far enough to allow the nose 22 of arm 21 to slip off the nose 23 of the drive lever 17 and the blades are allowed to close. If the sector member is adjusted clockwise, see FIG. 2, then the shutter speed can be increased because it reduces the length of time the retard mechanism restrains the master member after the blades are opened and the cam 22 thereof slips off nose 23 of lever 17 to allow the blades to close under the action of spring S.

Now in describing the embodiment of the invention shown in FIG. 1 it will be assumed that the shutter is a two-speed shutter, one a slow speed (1/40 sec.) for flash exposures and the other a fast speed (1/80 sec.) for daylight exposure. These two speeds are obtained by allowing the sector member 32 to move to the solid-line position shown in FIG. 2, which corresponds to the dotted-line position shown in FIG. 1, under the action of its spring 36, and moving it to a second position against the action of its spring and in which position it gives a 1/80 sec. exposure. Pivoted on a stud 50 on that side of the mechanism plate 10 within the shutter case 11 opposite the blade mechanism is a lever 51, one end 52 of which extends into a slot 53 in the periphery of an oscillatable ring 54 which can be selectively keyed, by means not shown, to a settable index ring 54' oscillatably mounted on the outside of a lens mount 55 to move between a "daylight" position and a "flash" position. A fixed index mark D on the ring 54' may cooperate with a fixed mark, not shown, on the shutter case to indicate the adjustment of the ring to its daylight position, while a fixed index mark F thereon cooperates with the guide number scale 100 to indicate adjustment of the ring to its flash position. To this end the settable ring and its associated structure may be constructed as shown in U.S. Patent 3,025,776, issued March 20, 1962, in the names of Bundschuh et al.

The other end 56 of the lever 51 is bent at right angles to the lever and extends over the top of the mechanism plate 10 within the casing 11 (see FIG. 2) and toward the rear of the camera. When the index ring 54' is turned clockwise to its "daylight" position, the lever 51 and its associated mechanism assume the solid-line position shown in FIG. 1 wherein the lever is swung counterclockwise about its pivot point 50 and a turned down lug 57' thereon engages a pin 57 extending from the arm 38 of the sector 32 to move the sector against the action of its spring 36 to set the shutter to a speed of 1/80 sec. At the same time, the end 56 of lever 51 engages lug 56' on pivoted flash signal 58 to move it against its spring 59 to the solid-line position where a flag portion 60 thereon covers a flash symbol 61 engraved or otherwise placed on the window 62 of the finder housing next to the viewfinder proper which may consist of a negative finder lens 63 and a positive eye lens 64 in optical alignment therewith. The flash symbol on the window 62 is adapted to be combined with the finder field by means of a 45° mirror 65 and a beam splitter 66 parallel thereto and extending across the the optical axis of the viewfinder proper. When the flag 60 is in its solid-line position, it cuts light from the flash symbol so that the symbol will not appear in the viewfinder.

When the index ring 54' is rotated counterclockwise to its "flash" position, the lever 51 is rotated clockwise about its pivot 50 to the dotted-line position (FIG. 1) thus allowing sector 32 to move to its dotted-line position under the action of its spring 36 where it sets the shutter to a 1/40 sec. speed. At the same time the end 56 of lever 51 allows the flash signal 58 to return to its dotted-line position under the action of its spring 59 whereupon the flag 60 uncovers the flash symbol 61 which then appears in the viewfinder.

With a multiple-speed shutter, the speed setting lever 51 is modified to clear the sector 32, or the lug 57' of the FIG. 1 embodiment is removed therefrom so as not to engage the pin 57 on the sector 32, see FIG. 3. In this embodiment, the sector is set at different shutter speed settings by a slide 70 mounted in the top portion of the shutter casing to slide transversely thereof, see FIG. 2. One end 71 of slide 70 abuts the arm 38 of the sector in opposition to the spring 36, see FIG. 2. The sector 32 is set at different arcuate positions to different shutter speeds by turning a speed knob 73 having a shutter speed scale 74 which cooperates with an index on a fixed part of the top wall of the camera, not shown, and which rotates a cam 75. The cam is engaged by a pin 76 on one end of an arm 77 fixed to a vertical shaft 78 journalled in a tubular bearing 79 carried by the base of a housing 80 mounted near the top of the camera but within the confines thereof. To the lower end of shaft 78, there is fixed on offset arm 81 of the shape best shown in FIG. 5 which is acted upon by a spring 82 to hold pin 76 against the cam 75. Arm 81 has a cutout 83 backed up by an upstanding wall 84. One end 85 of a wire spring wound about a stud 86 extends up through cutout 83 and is anchored against the upstanding wall 84, while the other end 87 thereof engages a notch N in one side of a turned down lug 88 on slide 70. A finger 90 on the end of arm 81 lies against the other side of lug 88. This connection between the arm 81 and the slide 70 in effect provides a positive connection to permit the knob 73 to shift the slide 70 adjusting the sector 32 to obtain the higher shutter speeds since the strength of spring end 87 is greater then, and overcomes, spring 36 tending to move sector 32 to its slow speed position. However, at the same time this connection provides a flexible joint between the arm 81 and the slide 70 so that even if the speed knob is set at one of the higher shutter speeds, when the index ring 54' is moved to its flash position, the end 56 of lever 51 can engage the end 71 of slide 70 and force the slide away from the sector 32 to allow the sector to assume its 1/40 sec. or flash position under the action of its spring 36, see the solid-line position of FIG. 2 which is the reverse of the position of the corresponding parts shown in FIG. 3. At this time the end 87 of spring 86 allows the slide 70 to move relative to the arm 81 without breaking the connection between the two. Just as soon as index ring 54' is returned to its "daylight" position then lever 51 is moved to its full-line position of FIG. 3 corresponding to its dotted-line position in FIG. 2, and the position of the sector 32 is again under the control of the speed knob 73 and slide 70 connected thereto.

While we have shown the camera set for flash and daylight exposures by an index ring rotatable about the lens mount, it will be understood that this setting could be accomplished by a setting member located at some other point on the camera and/or by moving the flash apparatus of the camera into operative position from an inoperative position, i.e., attaching the flash holder to the camera, withdrawing a retractable flash holder from an inoperative position within the camera to an operative position outside the camera, moving a reflector pivoted on the camera between operative and inoperative positions wherein it uncovers and covers, respectively, a flash lamp socket in the wall of the camera, etc. Also, the flash signal could consist of a movable mask having both "daylight" and "flash" designations and which in one position would show the word "flash" in the viewfinder and in the other position would show the word "daylight" in the finder. Furthermore, while we have specifically shown the mechanism adapted only to change the speed of the shutter, it will be understood that a diaphragm could be adjusted between two or more positions for the same purpose and/or both the diaphragm and shutter speed could be jointly adjusted without going beyond the scope of the present invention.

Although we have shown and described certain specific embodiments of our invention, we are fully aware that many modification thereof are possible. Our invention, therefore, is not to be restricted except in so far as is necessitated by the scope of the appended claims.

We claim:

1. In a photographic camera adapted for selectively making both daylight and flash exposures the combination of an adjustable exposure control means capable of a plurality of positions of adjustment, a certain one of said positions of adjustment being for flash exposures and the remainder of said positions of adjustment being for daylight exposures; manual means for adjusting said exposure control means throughout said range of adjustments in accordance with the prevailing light conditions for daylight exposures; a connection between said exposure control means and said manual means for adjusting the same which can be overridden; a member movably mounted on said camera for selective movement between a first position corresponding to flash exposures and a second position corresponding to daylight exposures; and means responsive to movement of said member to said first position for overriding said connection and adjusting said exposure control means to said certain position of adjustment when said exposure control adjusting means is adjusted to set said exposure control means to one of said remaining positions of adjustment, and responsive to movement of said member to said second position for restoring said connection and the control of adjustment of said exposure control means to said manual adjusting means.

2. A photographic camera according to claim 1 in which said connection which can be overridden comprises a flexible joint adapted to transmit movement from said manual means to said exposure control means which is broken when said member is moved to said first position.

3. In a photographic camera adapted for selectively making both daylight and flash exposures the combination of a multiple speed shutter capable of a plurality of instantaneous speeds, the slowest of said speeds being for flash exposures and the remaining speeds being for daylight exposures; means for adjusting the speed of said shutter including a manually adjustable speed knob; a rupturable connection between said speed knob and said shutter which can be overridden; a member movably mounted on said camera for selective movement between a first position corresponding to flash exposures and a second position corresponding to daylight exposures; and means responsive to movement of said member to said first position for overriding said connection and adjusting said shutter to said slowest speed when said speed knob is set to one of said remaining speeds, and responsive to movement of said member to said second position for restoring said connection and the speed control of said shutter to said speed knob.

4. A photographic camera according to claim 3 in which said means for adjusting the speed of said shutter further includes a spring loaded member in said shutter biased in a direction tending to adjust said shutter to said slow speed and positively urged in the same direction responsive to movement of said member to said first position and said rupturable connection comprises a spring connecting said speed knob to said spring loaded member, said spring being strong enough to overcome the bias of said spring loaded member when said speed knob is adjusted to increase the shutter speed but capable of being flexed and overridden when said spring loaded member is positively urged in response to movement of said member to said first position.

5. In a photographic camera adapted for both flash and daylight exposures the combination of a taking lens; an adjustable exposure control means capable of a plurality of positions of adjustment, a certain one of said positions of adjustment being for flash exposures and the remainder of said positions of adjustment being for daylight exposures; a viewfinder defining the field to be photographed; a flash signal associated with said viewfinder to selectively appear in and disappear from the field of said finder; a manual control for adjusting said exposure control means; means movable between two positions for selectively setting said camera for making flash and daylight exposures, respectively; and means for causing said flash signal to appear in said viewfinder and for adjusting said exposure control means to said certain position of adjustment regardless of the setting of said manual control when the camera is set for flash exposures, and for causing said flash signal to disappear from the field of said viewfinder and for adjusting said exposure control means to one of said remainder positions of adjustment when said camera is set for making daylight exposures.

6. In a photographic camera adapted for both flash and daylight exposures the combination of a taking lens; a shutter capable of a plurality of speeds, the slowest of which is for flash exposures and the remainder of which are for daylight exposures; a viewfinder defining the field to be photographed; a flash signal associated with said viewfinder to selectively appear in and disappear from the field of said finder; a manual control for adjusting the speed of said shutter; and means movable between two positions for selectively setting said camera for making flash and daylight exposures, respectively; and means for causing said flash signal to appear in said viewfinder and for adjusting said shutter speed to said slowest speed regardless of the speed setting of said manual control when the camera is set to make flash exposures, and for causing said flash signal to disappear from the field of said viewfinder and for adjusting said shutter speed to one of said remaining speeds when said camera is set for making daylight exposures.

7. A photographic camera according to claim 6, in which said manual control for adjusting the speed of the shutter includes a flexible coupling which can be overridden by said means for setting the camera when it is moved to the position for setting the camera for making flash exposures.

8. In a photographic camera adapted for selectively making both daylight and flash exposures the combination of an adjustable exposure control means capable of at least two positions of adjustment, a first position of adjustment for flash exposures and a second position of adjustment for daylight exposures; a viewfinder defining the field to be photographed; a flash signal associated with said viewfinder to selectively appear in and disappear from the field of said viewfinder; and means for causing said flash signal to appear in said viewfinder field when said exposure control means is moved to said first position of adjustment and for causing said flash signal to disappear from the field of said viewfinder when said exposure control means is moved to said second position of adjustment.

9. A photographic camera according to claim 8, in which said flash signal and its association with said viewfinder comprises a signal in said finder adapted to become visible when illuminated and invisible when illumination is cut off therefrom; and means for selectively illuminating said signal and cutting the illumination off therefrom.

10. In a photographic camera adapted for selectively making both daylight and flash exposures the combination of an adjustable exposure control means capable of at least two positions of adjustment, a first position of adjustment for flash exposures and a second position of adjustment for daylight exposures; a viewfinder defining the field to be photographed; a flash signal associated with said viewfinder to selectively appear in and disappear from the field of said viewfinder; means moving between two positions for selectively setting said camera for flash and daylight exposures, respectively; and means for causing said flash signal to appear in said viewfinder field and for adjusting said exposure control means to said first position of adjustment when the camera is set to make flash exposures, and for causing said flash signal to disappear from the field of said viewfinder and for adjusting said exposure control means to said second position of adjustment when said camera is set for making daylight exposures.

11. In a photographic camera adapted for selectively making both daylight and flash exposures the combination of an adjustable exposure control means capable of at least two positions of adjustment, a first position of adjustment for flash exposures and a second position of adjustment for daylight exposures; a viewfinder defining the field to be photographed; a flash signal associated with said viewfinder to selectively appear in and disappear from the field of said viewfinder; a selector member movable between a first setting, wherein it sets said camera for flash exposures, and a second setting, wherein it sets said camera for daylight exposures; and means connecting said selector member to each of said exposure control means and said flash signal for causing said flash signal to appear in said viewfinder field and for adjusting said exposure control means to said first position of adjustment when said selector member is moved to said first setting, and for causing said flash signal to disappear from the field of said viewfinder and for adjusting said exposure control means to said second position of adjustment when said selector member is moved to said second setting.

12. In a photographic camera adapted for both daylight and flash exposures the combination with a taking lens; a shutter capable of at least two different shutter speeds, a slow one for flash exposures and a faster one for daylight exposures; a viewfinder defining the field to be photographed; a flash signal associated with said viewfinder to selectively appear in and disappear from the field of said viewfinder; means for adjusting the speed of said shutter; means for selectively setting said camera for making flashlight and daylight exposures; and means for causing said flash signal to appear in said viewfinder and adjusting said shutter to said slow speed when the camera is set for making flash exposures, and for causing said flash signal to disappear from the field of said viewfinder and adjusting said shutter to said faster speed when the camera is set for making daylight exposures.

13. A photographic camera according to claim 12, in which said means for selectively setting said camera for making flashlight and daylight exposures includes an index ring concentric with the optical axis of said taking lens and oscillatable between two positions.

No references cited.